United States Patent
Manson

(10) Patent No.: US 8,321,070 B2
(45) Date of Patent: Nov. 27, 2012

(54) THREAT OBJECT MAP CREATION USING A THREE-DIMENSIONAL SPHERICITY METRIC

(75) Inventor: Steven J. Manson, Tucson, AZ (US)

(73) Assignee: Raytheon Company, Waltham, MA (US)

(*) Notice: Subject to any disclaimer, the term of this patent is extended or adjusted under 35 U.S.C. 154(b) by 863 days.

(21) Appl. No.: 12/467,750

(22) Filed: May 18, 2009

(65) Prior Publication Data

US 2012/0053835 A1    Mar. 1, 2012

(51) Int. Cl.
*G06F 17/00*  (2006.01)
*G06F 19/00*  (2011.01)
*G01S 13/00*  (2006.01)
*G01S 13/66*  (2006.01)
*G01S 13/89*  (2006.01)
*G06K 9/00*  (2006.01)
*G06G 7/80*  (2006.01)

(52) U.S. Cl. ............ 701/3; 235/400; 235/404; 235/410; 235/411; 342/25 R; 342/25 A; 342/52; 342/53; 342/58; 342/61; 342/62; 342/64; 342/66; 342/67; 342/73; 342/89; 342/90; 382/100; 382/103

(58) Field of Classification Search ........... 701/532, 701/1, 3; 235/400, 404, 409, 410, 411, 412, 235/417; 342/64, 90, 61, 62, 63, 89, 52, 342/53, 54, 58, 59
See application file for complete search history.

(56) References Cited

U.S. PATENT DOCUMENTS

| | | | |
|---|---|---|---|
| 4,899,161 A * | 2/1990 | Morin et al. | 342/451 |
| 6,910,657 B2 * | 6/2005 | Schneider | 244/3.11 |
| 7,032,858 B2 * | 4/2006 | Williams | 244/3.15 |
| 7,236,121 B2 * | 6/2007 | Caber | 342/62 |
| 7,551,121 B1 * | 6/2009 | O'Connell et al. | 342/54 |

FOREIGN PATENT DOCUMENTS

EP    431892 A2 *  6/1991

* cited by examiner

*Primary Examiner* — Behrang Badii
*Assistant Examiner* — Dale W Hilgendorf
(74) *Attorney, Agent, or Firm* — Daly, Crowley, Mofford & Durkee, LLP

(57) ABSTRACT

In order to target and intercept a desired object within a number of objects detected in an environment, detection data is received from two different sensors, where the detection data includes spatial coordinates. A set of four-point subsets (tetrahedra) are selected from each set of spatial coordinates. A number of correlation maps are determined between the first set of spatial coordinates and the second set of spatial coordinates based on the plurality of four-point subsets. The mean sphericity for each corresponding plurality of four-point subsets in the plurality of correlation maps is determined, and a threat object map based on the correlation map having the greatest mean sphericity is created. The desired object is targeted based on the correlation map.

20 Claims, 5 Drawing Sheets

THREAT OBJECT MAP CREATION USING A THREE-DIMENSIONAL SPHERICITY METRIC

TECHNICAL FIELD

The present invention generally relates to targeting methods used in the context of inconsistent data from multiple sensors, and more particularly relates to the use of such methods and systems in connection with missile systems, kill vehicles (KVs), and the like.

BACKGROUND

In order to facilitate the targeting and interception of a desired target object within an environment, a missile, kill vehicle, or other such object will typically be required to select the desired target from a set of candidate targets within its field of view.

That is, as shown conceptually in FIG. 1, a kill vehicle (KV) 110 will be typically be instructed (e.g., by a ground-based battle manager 111) to intercept an object (which may appear as a point to many sensors) selected from what could be hundreds or even thousands of objects 150 within the relevant environment (represented conceptually by points A-H).

Generally, the positional information forwarded to KV 110 has been acquired by a number of different sensors (102, 104) that are geographically remote from each other. In order to reconcile detection information from multiple sources, it is advantageous to produce a threat object map (TOM) that assists KV 110 in determining the correct object to intercept by reconciling conflicting data.

Current methods of producing TOMs are unsatisfactory in a number of respects. For example, each sensor 102 and 104 will typically have its own operational characteristics and will be subject to a variety of detection errors, including, for example, sensor bias, spurious detections, position errors, and dropouts. As a result, a KV 110 may be instructed to intercept an object at point 160 when in actuality there is no such object at that location. In such a case, KV 110 will have to make a decision as to which of the nearby objects (in this case, points C, D, and G) is the desired target object.

Accordingly, there is a need for improved methods of determining an accurate threat object map when presented with conflicting or inconsistent data from multiple sensors. Other desirable features and characteristics of the present invention will become apparent from the subsequent detailed description and the appended claims, taken in conjunction with the accompanying drawings and the foregoing technical field and background.

BRIEF SUMMARY

In accordance with one embodiment of the present invention, a threat object map creation system includes a first sensor configured to acquire a first set of detection data associated with a plurality of objects within an environment, wherein the first set of detection data including a first set of spatial coordinates; and a second sensor geographically remote from the first sensor and configured to acquire a second set of detection data associated with the plurality of objects, the second set of detection data including a second set of spatial coordinates. A TOM creation module is configured to receive and store the first and second sets of detection data, determine a plurality of correlation maps between the first set of spatial coordinates and the second set of spatial coordinates based on a plurality of four-point subsets selected from each set of spatial coordinates, determine the mean sphericity for each corresponding plurality of four-point subsets in the plurality of correlation maps, and create a threat object map based on the correlation map having the greatest mean sphericity.

A method of targeting a desired object within a plurality of objects detected in an environment includes the steps of: receiving, from a first sensor, a first set of detection data associated with the plurality of objects, the first set of detection data including a first set of spatial coordinates; receiving, from a second sensor geographically remote from the first sensor, a second set of detection data associated with the plurality of objects, the second set of detection data including a second set of spatial coordinates; selecting a plurality of four-point subsets from each set of spatial coordinates; determining a plurality of correlation maps between the first set of spatial coordinates and the second set of spatial coordinates based on the plurality of four-point subsets; determining the mean sphericity for each corresponding plurality of four-point subsets in the plurality of correlation maps; creating a threat object map based on the correlation map having the greatest mean sphericity; targeting the desired object based on the correlation map.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following discussion generally relates to methods and apparatus for the use of a three-dimensional ensemble sphericity measure to create a threat object map (TOM) from disparate sets of detection data received from multiple sensors. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to sensors, kill-vehicles, missiles, and the like will not be described herein.

Figure 1:
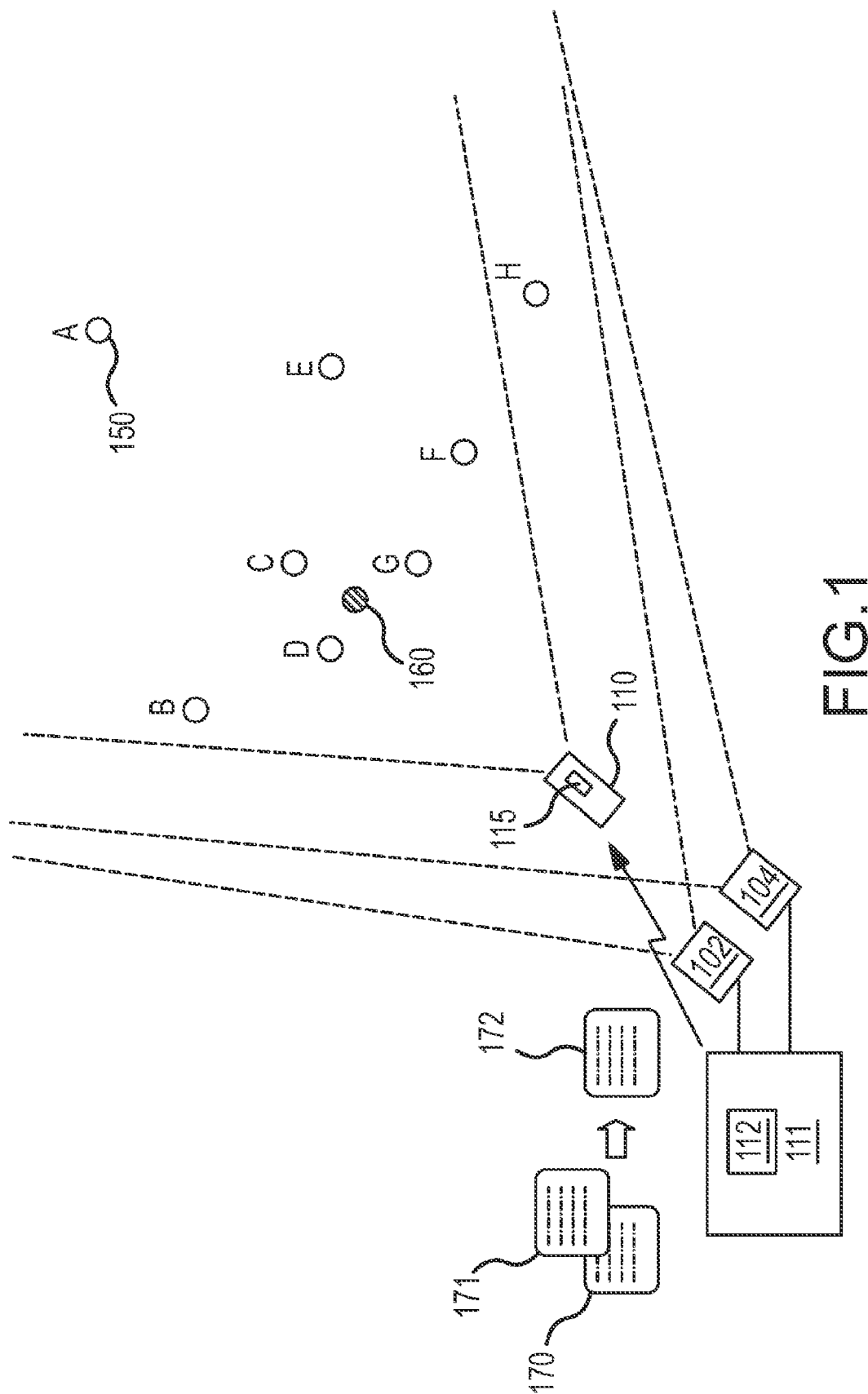
FIG. 1 is a conceptual overview of a framework useful in describing the present invention.

Referring now to FIG. 1, a threat object map system in accordance with the present invention generally includes one or more sensors 102 and 104, a battle manager system in, and a TOM creation module (or simply "module") 112. Module 112 may reside within battle manager system in, but may also reside within one of the sensors or within the kill vehicle (KV) 110.

Each sensor 102, 104 is configured to acquire a set of detection data (170 and 171, respectively) associated with the detected objects 150 within the environment. The detection data 170 and 171 will typically include at least a set of spatial coordinates (which may be two-dimensional or three-dimensional), as well as various additional attribute data depending upon the nature of the sensor. In general, detection data 170 and 171 are computed based on a given frame of reference and thus reduce to two dimensions. Module 112 and battle manager in produce a TOM 172 based on the sets of detection data 170, 171 and forward (or "handover") all or a portion of TOM 172 to KV 110 so that the desired target object (for example, point G) may be intercepted.

While the illustrated embodiment includes only two sensors 102, 104, the invention is not so limited, and may include any number of sensors. Furthermore, the sensors 102, 104 will typically be geographically remote—i.e., separated by some non-zero distance ranging from inches to miles. Sensors 102 may also have a variety of fields of view (represented by dashed lines). That is, some sensors may produce a top-down view, some may produce a side view from a moving object, while others might produce a ground-based view. Furthermore, each sensor will typically be prone to a variety of errors, including for example absolute position errors, sensor bias, dropouts, and spurious detections.

The term "sensor" is used herein to refer to any component able to sense some attribute of an object 150. Such sensors may include, for example, radar, infrared, and optical sensors. The present invention is applicable, however, to any combination of sensor types now known or later developed.

The term "kill vehicle" is used without loss of generality to refer to any vehicle, object, missile, or the like that is capable of using a threat object map or a subset of information from a threat object map to target and intercept an object in an environment.

Module 112 (which may include any combination of hardware and software) works in conjunction with battle manager 111, which also may include any number of computers, storage devices, displays, i/o devices, transceivers, servers, networks, or the like.

In general, module 112 receives and stores the first and second sets of detection data 170 and 171 from the available sensors 102, 104. It then applies a three-dimensional sphericity metric to the sets of detection data 170 and 171 to produce TOM 172. More particularly, module 112 determines a plurality (i.e., two or more) of correlation maps between the first set of spatial coordinates in detection data 170 and the second set of spatial coordinates in detection data 171 based on a plurality of N+1 (e.g., 3+1) point subsets selected from each set of spatial coordinates in detection data 170 and 171, where N is the number of independent correlatable dimensions to be included in the threat object map.

Next, module 112 determines the mean sphericity for each corresponding plurality of four-point subsets in the plurality of correlation maps, and then creates TOM 172 based on the correlation map having the greatest mean sphericity. All or a part of TOM 172 is then forwarded to KV 110, which will typically include one or more processors 115.

Figure 11:
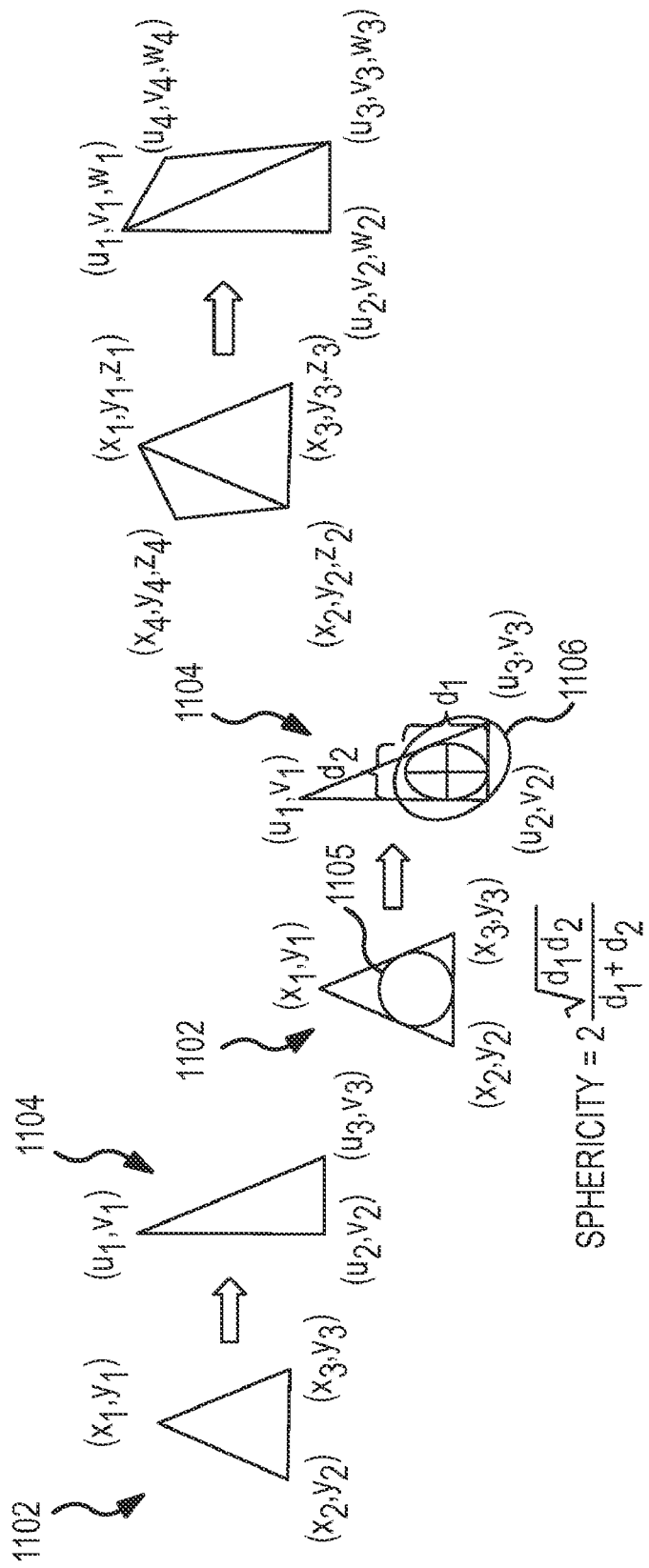
FIG. 11 illustrates a two-dimensional sphericity method useful in understanding the present invention.

Sphericity is a metric that is used to determine whether two triangles (or tetrahedrons, or corresponding simplex solids in any dimensional space greater than three) are geometrically similar. Referring momentarily to FIG. 11, for example, in order to test the similarity of triangles 1102 and 1104, a circle 1105 is first inscribed within triangle 1102. A corresponding ellipse 1106 is then inscribed within triangle 1104, preserving the contact points along each line segment (i.e., the relative location along each line segment). The sphericity is then computed as:

$$\text{Sphericity} = 2\frac{\sqrt{d_1 d_2}}{d_1 + d_2}$$

Where d1 and d2 are the minor and major axes of the inscribed ellipse 1106.

For the three-dimensional analog used in connection with the present invention, in which one tetrahedron is compared to another tetrahedron, the sphericity of the resulting ellipsoid is computed as:

$$S = \frac{(\det(g'g))^{1/n}}{\frac{1}{n}tr(g'g)}$$

Where:

$$B = \begin{bmatrix} x_1 & y_1 & z_1 & 1 \\ x_2 & y_2 & z_2 & 1 \\ x_3 & y_3 & z_3 & 1 \\ x_4 & y_4 & z_4 & 1 \end{bmatrix}$$

and:

$$\begin{bmatrix} g_{11} & g_{12} & g_{13} \\ g_{21} & g_{22} & g_{23} \\ g_{31} & g_{32} & g_{33} \\ t_1 & t_2 & t_3 \end{bmatrix} = B^{-1} \begin{bmatrix} u_1 & v_1 & w_1 \\ u_2 & v_2 & w_2 \\ u_3 & v_3 & w_3 \\ u_4 & v_4 & w_4 \end{bmatrix}$$

In this regard, FIGS. 2-9 present two-dimensional maps helpful in describing various aspects of the present invention, and its use of a sphericity metric, as discussed in further below. As a threshold matter, it will be appreciated that the various maps and points shown in the drawings are limited to two-dimensions only for the purposes of clarity and simplicity. It will be apparent to those skilled in the art that the two-dimensional method described in conjunction with these figures can be applied to coordinate data with three or more dimensions.

Figure 2:
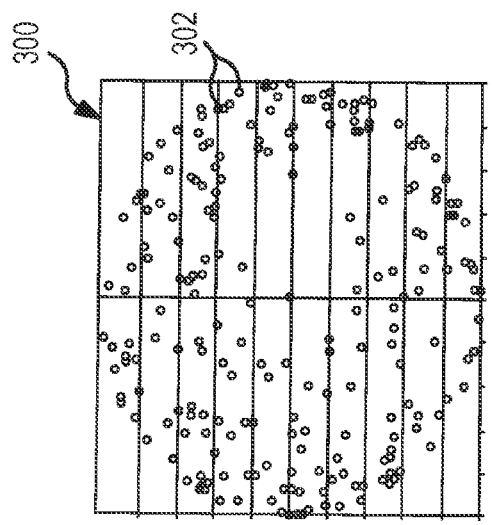
FIGS. 2-9 illustrate various detection data plots sequentially depicting the creation and selection of an optimal correlation map.
Figure 3:
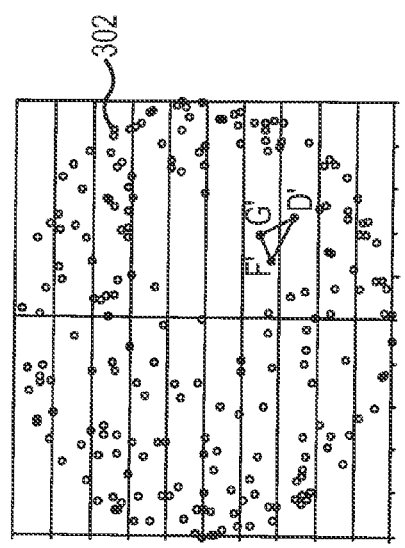

Initially, sets of detection data are received from one or more sensors (step 1001). FIG. 2 illustrates a map 200 of seven sample detection data points 202 in a cluster 204. For reference purposes, the points 202 are labeled arbitrarily A-G. FIG. 3 is a map 300 of points 302 in which it is desired to identify cluster 204. As can be seen, the scale and rotation of map 300 is different, and a large number of additional points 302 has been added.

As illustrated in FIG. 2, a number of triangles may be produced sequentially using, for example, nearest-neighbor methods. Thus, cluster 204 may be partitioned into four triangles: ABC, CED, DEG, and DGF. The system will progress cumulatively through these triangles and try to find corresponding matches within map 300 using a sphericity metric.

Figure 4:
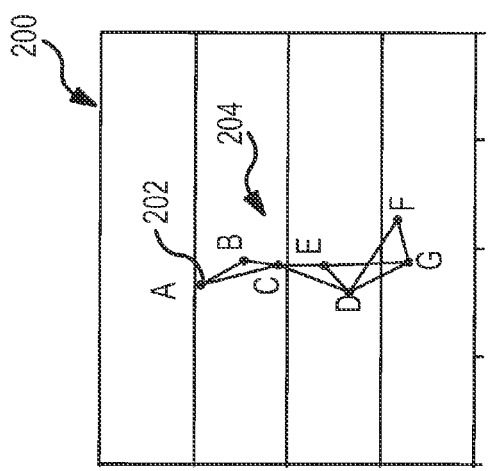
Figure 5:
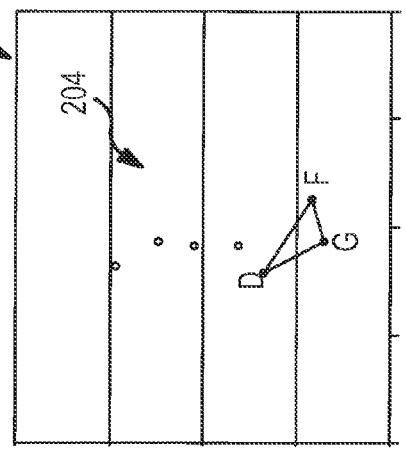
Figure 7:
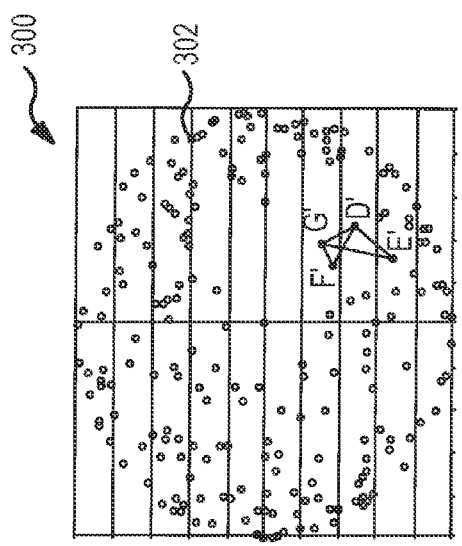

Referring to FIG. 4, the system selects (either arbitrarily, or through some other selection process), a starting triangle DGF from map 200. It then selects a candidate triangle D'G'F' from map 300 as shown in FIG. 5, and computes the sphericity of this match. If the sphericity is below some threshold indicating that the points are substantially collinear (or coplanar in the case of three dimensional data), this triangle may be discarded, and another selected. If the sphericity is sufficiently high (for example, about 0.95 in the illustrated case), the system continues attempting to match triangles.

Figure 6:
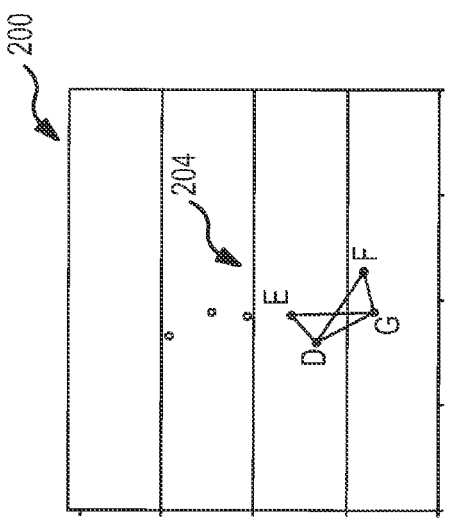

In FIG. 6, a second triangle EDG is selected (for example, using a nearest-neighbor method), and a corresponding triangle E'D'G' is chosen. Again, the sphericity of the match if determined. If the match appears to be below some threshold, the system attempts to skip one or more points in the data set of map 300 (e.g., to counter dropouts or spurious detections).

The system continues as above for various combinations of points 300 in map 302, thereby producing a number of correlation maps. Using any suitable criteria, the best correlation map is selected. In one embodiment, for example, the average sphericity for the sum of triangle comparisons is used.

Figure 9:
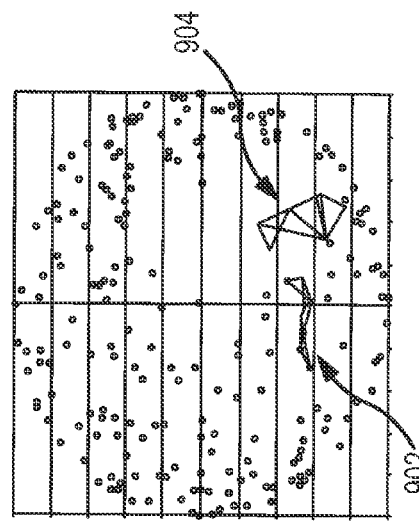
Figure 8:
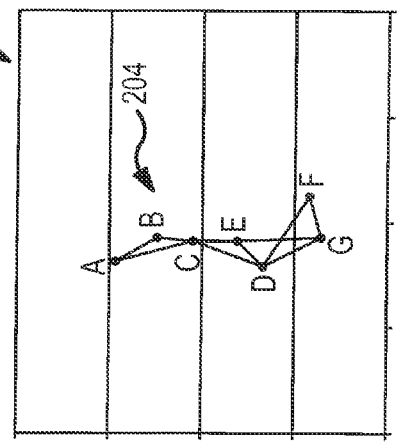

As shown in FIGS. 8 and 9, for example, a cluster 902 and associated correlation map may have an average sphericity close to 1.0, while another cluster 904 within another correlation map may have an average sphericity of about 0.2. In such a case, the correlation map corresponding to the mapping of points in cluster 204 with points in cluster 902 would be deemed optimal.

Figure 10:
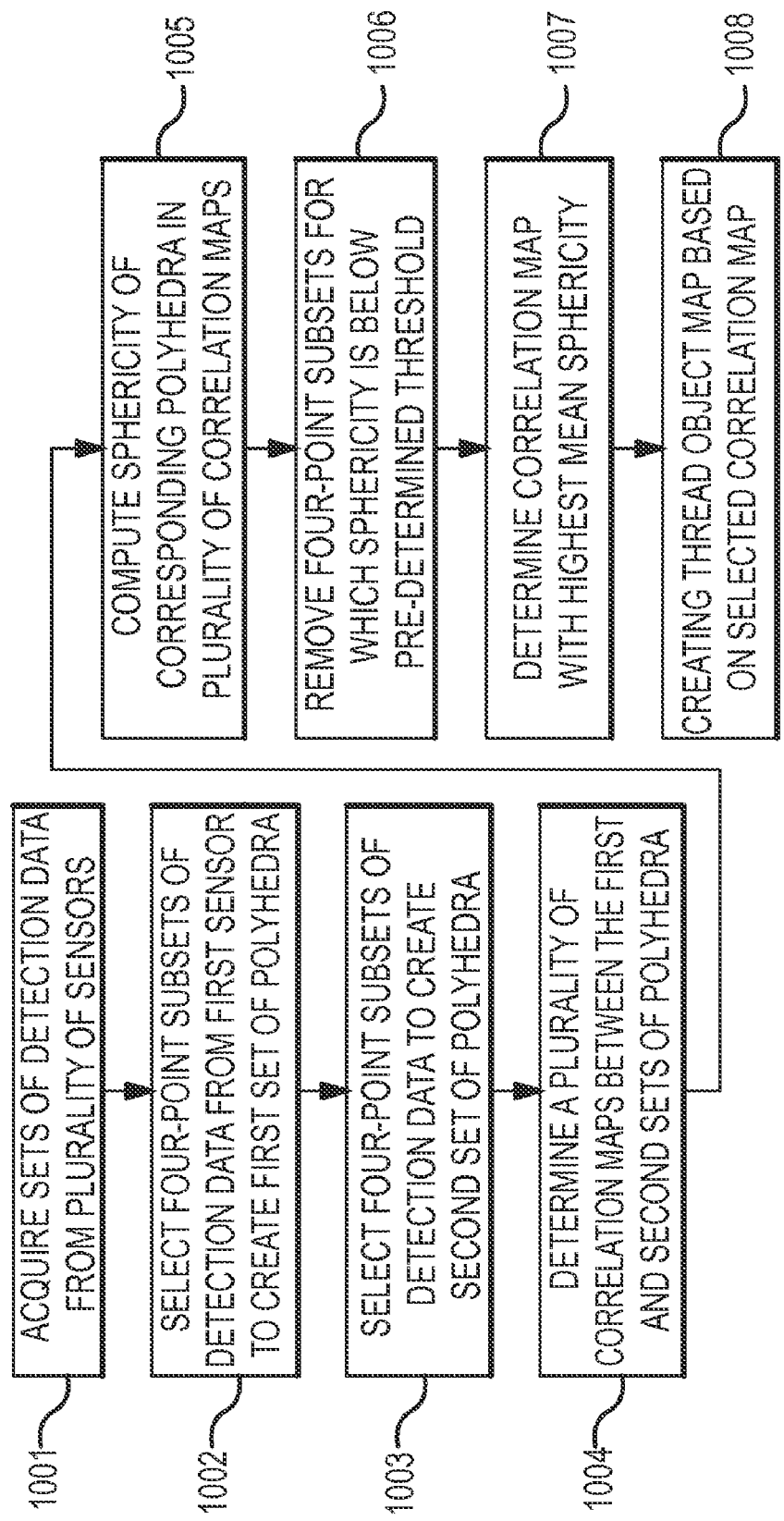
FIG. 10 is a block diagram of a exemplary method in accordance with one embodiment of the invention.

FIG. 10 is a conceptual flowchart that illustrates and summarizes the method in a three-dimensional context. As shown, the system first acquires sets of detection data from one or more sensors (step 1001). Next, four-point subsets of the detection data is selected from the sensors to create corresponding sets of tetrahedra (steps 1002-1003). Next, in step 1004, the system determines a number of correlation maps between the first and second sets of polyhedra (step 1004), then computes the sphericity of these corresponding polyhedra (step 1005). The system may remove four-point subsets for which the sphericity is below some predetermined threshold (step 1006). Next, the system determines the correlation map having the highest mean sphericity (step 1007). Finally, a TOM is created based on the selected correlation map 1008.

Referring again to FIG. 1, the TOM 172 will consist of a data set that includes coordinate information in addition to attribute data (if any) known about point objects iso. TOM 172 may be forwarded to KV 110 in this form, or may converted to a simpler data set prior to hand-off to KV 110. In one embodiment, for example, the three dimensional data within TOM 172 is converted to a two-dimensional projection corresponding to the viewpoint of KV 110.

Experimental results have shown that use of a sphericity metric as described is highly advantageous, in that the method is highly insensitive to biased position data (i.e., angular offsets or pointing errors), and reasonably robust to noisy data, drop-outs, and spurious detections.

The methods disclosed may also be applied to similar targeting problems. For example, rather than dealing with point objects in an environment, if known features of an object (such as a tank, vehicle, weapon, or any other object) are mapped to points in space, those points can also be used for pattern recognition using a sphericity metric, assuming that those features correlate sufficiently from sensor to sensor.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A threat object map system comprising:
a first sensor configured to acquire a first set of detection data associated with a plurality of objects within an environment, the first set of detection data including a first set of spatial coordinates;
a second sensor geographically remote from the first sensor and configured to acquire a second set of detection data associated with the plurality of objects, the second set of detection data including a second set of spatial coordinates;
a threat object map creation module configured to:
receive and store the first and second sets of detection data;
determine a plurality of correlation maps between the first set of spatial coordinates and the second set of spatial coordinates based on a plurality of N+1 point subsets selected from each set of spatial coordinates;
determine the mean sphericity for each corresponding plurality of four-point subsets in the plurality of correlation maps;
and create a threat object map based on the correlation map having the greatest mean sphericity,
wherein N is the number of independent correlatable dimensions in the threat object map.

2. The threat object map system of claim 1, further comprising: a kill vehicle configured to maneuver to intercept an intended target in accordance with the threat object map.

3. The threat object map system of claim 2, wherein the kill vehicle includes a transceiver configured to receive the threat object map from an external source.

4. The threat object map system of claim 2, wherein the kill vehicle includes a transceiver configured to receive a two-dimensional projection of the threat object map from an external source.

5. The threat object map system of claim 2, wherein the threat object map creation module resides within the kill vehicle.

6. The threat object map system of claim 1, wherein the threat object map creation modules resides in a ground-based battle management system.

7. The threat object map system of claim 1, wherein the plurality of sensors include one or more sensors selected from the group consisting of infrared, radar, and optical.

8. The threat object map system of claim 1, wherein the threat object map includes non-coordinate data attributes associated with each object.

9. The threat object map system of claim 1, wherein N=3.

10. The threat object map system of claim 1, wherein the threat object map creation module is configured to select the plurality of point subsets from each set of spatial coordinates based on nearest-neighbor position.

11. The threat object map system of claim 1, wherein the threat object map creation module is configured to remove the point subsets for which the sphericity is below a predetermined threshold.

12. A method of targeting a desired object within a plurality of objects detected in an environment, the method comprising:
receiving, from a first sensor, a first set of detection data associated with the plurality of objects, the first set of detection data including a first set of spatial coordinates;
receiving, from a second sensor geographically remote from the first sensor, a second set of detection data associated with the plurality of objects, the second set of detection data including a second set of spatial coordinates;
selecting a plurality of N+1 point subsets from each set of spatial coordinates;

determining a plurality of correlation maps between the first set of spatial coordinates and the second set of spatial coordinates based on the plurality of point subsets;

determining the mean sphericity for each corresponding plurality of point subsets in the plurality of correlation maps;

creating a threat object map based on the correlation map having the greatest mean sphericity;

targeting the desired object based on the correlation map.

13. The method of claim 12, further including intercepting, with a kill vehicle, the desired object in accordance with the targeting step.

14. The method of claim 13, further including sending the threat object map to the kill vehicle.

15. The method of claim 13, further including sending a two-dimensional projection of the threat object map to the kill vehicle.

16. The method of claim 13, including performing the step of creating the threat object map within the kill vehicle.

17. The method of claim 12, further including selecting the plurality of point subsets from each set of spatial coordinates based on nearest-neighbor position.

18. The method of claim 12, further including removing any of the point subsets for which the sphericity is below a predetermined threshold.

19. A method for intercepting a desired object within an environment containing a plurality of objects, the method comprising:

receiving a plurality of sets of detection data from a respective plurality of sensors, wherein at least a portion of the detection data includes three dimensional coordinate information associated with one or more of the objects;

selecting substantially non-coplanar tetrahedral subsets of the coordinate information from the detection data to determine a plurality of correlation maps;

selecting an optimal correlation map based on a three-dimensional sphericity metric applied to the tetrahedral subsets of coordinate information;

instructing a kill vehicle to intercept the desired object based on the optimal correlation map.

20. The method of claim 19, further including selecting the tetrahedral subsets from each set of spatial coordinates based on nearest-neighbor position.

* * * * *